United States Patent
Tsukada

(10) Patent No.: US 11,631,850 B2
(45) Date of Patent: Apr. 18, 2023

(54) ALL-SOLID-STATE BATTERY

(71) Applicant: TDK CORPORATION, Tokyo (JP)

(72) Inventor: Takeo Tsukada, Tokyo (JP)

(73) Assignee: TDK CORPORATION, Tokyo (JP)

( * ) Notice: Subject to any disclaimer, the term of this patent is extended or adjusted under 35 U.S.C. 154(b) by 399 days.

(21) Appl. No.: 16/498,848

(22) PCT Filed: Mar. 28, 2018

(86) PCT No.: PCT/JP2018/012972
§ 371 (c)(1),
(2) Date: Sep. 27, 2019

(87) PCT Pub. No.: WO2018/181577
PCT Pub. Date: Oct. 4, 2018

(65) Prior Publication Data
US 2020/0091518 A1 Mar. 19, 2020

(30) Foreign Application Priority Data
Mar. 30, 2017 (JP) .............................. JP2017-067404

(51) Int. Cl.
*H01M 10/0525* (2010.01)
*H01M 4/58* (2010.01)
(Continued)

(52) U.S. Cl.
CPC ........... *H01M 4/5825* (2013.01); *C01B 25/45* (2013.01); *H01M 10/0525* (2013.01);
(Continued)

(58) Field of Classification Search
CPC ......... H01M 10/0585; H01M 10/0562; H01M 10/0525; H01M 4/5825; H01M 2300/0068
See application file for complete search history.

(56) References Cited

U.S. PATENT DOCUMENTS

2010/0261060 A1* 10/2010 Choy ................... H01M 4/5825
436/127
2015/0333362 A1* 11/2015 Sato .................... H01M 10/052
429/233
(Continued)

FOREIGN PATENT DOCUMENTS

JP 2002-530835 A 9/2002
JP 2014-102911 A 6/2014
(Continued)

OTHER PUBLICATIONS

Oct. 1, 2019 International Preliminary Report on Patentability issued in International Patent Application No. PCT/JP2018/012972.

*Primary Examiner* — Osei K Amponsah
(74) *Attorney, Agent, or Firm* — Oliff PLC

(57) ABSTRACT

An objective of the present invention is to provide an all-solid-state battery with a high discharge capacity in which lithium vanadium phosphate is used as a positive electrode active material layer and a negative electrode active material layer. According to the present invention, the positive electrode active material layer and the negative electrode active material layer of the all-solid-state battery having an all-solid-state electrolyte between a pair of electrodes contain the lithium vanadium phosphate, the lithium vanadium phosphate contains a polyphosphate compound containing Li and V, and the lithium vanadium phosphate contains $Li_3V_2(PO_4)_3$ as a main phase and contains 1.0% by weight or more and 15.0% by weight or less of $Li_3PO_4$ relative to $Li_3V_2(PO_4)_3$, whereby a high discharge capacity can be provided.

6 Claims, 1 Drawing Sheet

(51) Int. Cl.
*C01B 25/45* (2006.01)
*H01M 10/0562* (2010.01)
*H01M 10/0585* (2010.01)

(52) U.S. Cl.
CPC .............. *H01M 10/0562* (2013.01); *H01M 10/0585* (2013.01); *C01P 2006/40* (2013.01); *H01M 2220/30* (2013.01); *H01M 2300/0068* (2013.01)

(56) References Cited

U.S. PATENT DOCUMENTS

| | | | |
|---|---|---|---|
| 2016/0006023 A1* | 1/2016 | Krkljus | H01M 4/525 |
| | | | 429/223 |
| 2017/0040601 A1 | 2/2017 | Nakayama | |
| 2018/0102540 A1* | 4/2018 | Shindo | H01M 4/1391 |

FOREIGN PATENT DOCUMENTS

| | | |
|---|---|---|
| JP | 2015-079702 A | 4/2015 |
| JP | 2015-164116 A | 9/2015 |
| JP | 2016-001598 A | 1/2016 |
| JP | 2016-219188 A | 12/2016 |
| JP | 2017-037766 A | 2/2017 |
| WO | 00/31812 A1 | 6/2000 |

* cited by examiner

ALL-SOLID-STATE BATTERY

The present invention relates to an all-solid-state battery which has a high discharge capacity and a high security and can be manufactured with a low cost.

BACKGROUND

In recent years, with the development of portable devices such as personal computer, mobile phone and the like, the demand for batteries used as power supplies thereof is expanding sharply. In a battery used for such a use, a liquid electrolyte (electrolytic solution) such as an organic solvent is conventionally used as a medium for the ion movement. In a battery using such an electrolytic solution, a problem such as leakage of the electrolytic solution may occur.

In order to eliminate such a problem, development of an all-solid-state battery using a solid electrolyte instead of a liquid electrolyte and in which all other elements are made of solids is being advanced. Since the electrolyte of such an all-solid-state battery is solid, there is no need to worry about liquid leakage, liquid depletion, etc., and additionally, problems such as deterioration of battery performance resulting from corrosion are difficult to occur. Moreover, the all-solid-state battery is actively studied in various aspects as a secondary battery capable of easily achieving high charge and discharge capacity and energy density.

However, the all-solid-state battery using a solid electrolyte as an electrolyte still has a problem of being a small discharge capacity when compared with a battery using a liquid electrolyte. It is disclosed that $Li_3V_2(PO_4)_3$ (which is a polyphosphate based electrode active material having a plurality of oxidation-reduction potentials (3.8 V, 1.8 V)) is used for a positive electrode and a negative electrode to produce a battery having symmetrical electrodes, thereby improving charge-discharge cycle characteristics, but improvement of the discharge capacity is not disclosed (Patent Document 1). Further, when $Li_3V_2(PO_4)_3$ of stoichiometric composition is used as a sintered body active material in the positive electrode or the negative electrode, composition of the grain boundary formed during sintering process becomes non-uniform, and lithium ion conduction is hindered. Thus, a high discharge capacity cannot be achieved.

Therefore, even for the all-solid-state battery disclosed in Patent Document 1, there is still room for improvement regarding the discharge capacity.

PATENT DOCUMENTS

Patent Document 1: JP2002-530835A

SUMMARY

The present invention has been made in view of the above-described problems in the prior art, and an objective of the present invention is to provide an all-solid-state battery having a high discharge capacity.

The present inventors have made intensive studies in order to solve the above-described problem. As a result, the present inventors have found out that a positive electrode active material layer and a negative electrode active material layer contain lithium vanadium phosphate, and in a polyphosphate compound containing Li and V, an amount of $Li_3PO_4$ contained in the lithium vanadium phosphate is in relation to a capacity, and thus the present invention is completed.

That is, according to the present invention, an all-solid-state battery described below is provided.

The all-solid-state battery of the present invention is characterized in that the all-solid-state battery comprises a solid electrolyte layer between a pair of electrode layers, wherein a positive electrode active material layer and a negative electrode active material layer constituting the pair of electrode layers contain lithium vanadium phosphate, the lithium vanadium phosphate contains a polyphosphate compound containing Li and V, the lithium vanadium phosphate contains $Li_3V_2(PO_4)_3$ as a main phase, and the lithium vanadium phosphate contains 1.0% by weight or more and 15.0% by weight or less of $Li_3PO_4$ relative to $Li_3V_2(PO_4)_3$.

According to this constitution, $Li_3PO_4$ present in a grain boundary portion of the positive electrode active material layer or the negative electrode active material layer can alleviate a structural disorder generated at a grain boundary interface, and thus a uniform grain boundary can be formed. Hence, reduction in lithium ion conduction between the crystal grains can be suppressed, high ion conduction can be achieved, and a high capacity can be realized.

The all-solid-state battery of the present invention is characterized in that the solid electrolyte layer contains lithium aluminum titanium phosphate.

According to this constitution, when a lithium aluminum titanium phosphate solid electrolyte is used for the solid electrolyte layer, as grain boundary between the positive electrode active material and the solid electrolyte or grain boundary between the negative electrode active material and the solid electrolyte is uniformly bonded by means of polyphosphate based ceramics, formation of a non-uniform grain boundary such as one that hinders a lithium ion movement can be suppressed in these interfaces, and a reduction in ion conduction can be prevented. Therefore, high ion conduction can be achieved, and a high capacity can be realized.

The all-solid-state battery of the present invention is characterized in that the solid electrolyte material composed of the phosphate compound is $Li_fAl_gTi_hP_iO_j$ (wherein f, g, h, i and j are numbers respectively satisfying $0.5 \leq f \leq 3.0$, $0.0 < g \leq 1.0$, $1.0 \leq h \leq 2.0$, $2.8 \leq i \leq 3.2$, and $9.25 < j \leq 15.0$).

According to this constitution, as $Li_fAl_gTi_hP_iO_j$ (wherein f, g, h, i and j are numbers respectively satisfying $0.5 \leq f \leq 3.0$, $0.0 < g \leq 1.0$, $1.0 \leq h \leq 2.0$, $2.8 \leq i \leq 3.2$, and $9.25 < j \leq 15.0$) having a high lithium ion conductivity is used as the lithium aluminum titanium phosphate, a higher capacity can be obtained.

The all-solid-state battery of the present invention is characterized in that the pair of electrode layers and the solid electrolyte layer disposed between the pair of electrode layers have a relative density of 80% or above.

According to the present invention, an all-solid-state battery having a high discharge capacity can be provided.

DETAILED DESCRIPTION OF EMBODIMENTS

Figure 1:
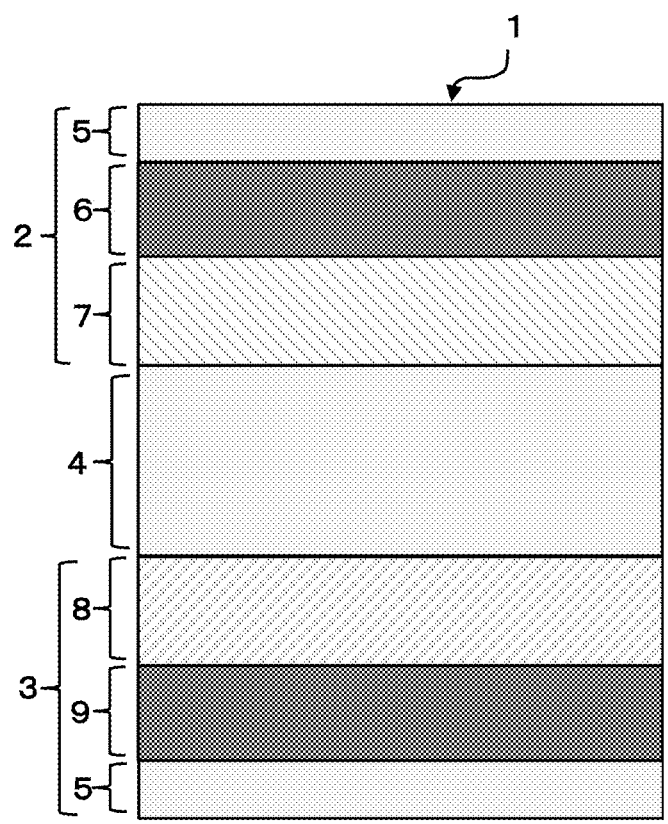
FIG. 1 is a diagram illustrating an all-solid-state battery of the present embodiment.

Hereinafter, preferred embodiments of the present invention will be described with reference to the accompanying drawings. In addition, the same or corresponding components in the drawings are denoted with the same symbol, and the repeated description is omitted. Further, the dimension ratio in the drawings is not limited to the illustrated ratio.

[All-Solid-State Battery]

FIG. 1 is a diagram illustrating a conceptual structure of an all-solid-state battery 1 of the present embodiment. As shown in FIG. 1, the all-solid-state battery 1 of the present embodiment is formed by laminating a positive electrode layer 2 and a negative electrode layer 3 via an all-solid-state electrolyte layer 4, the positive electrode layer 2 is composed of a package layer 5, a positive electrode current collector layer 6, and a positive electrode active material layer 7, and the negative electrode layer 3 is composed of a negative electrode active material layer 8, a negative electrode current collector layer 9, and a package layer 5.

The all-solid-state battery of the present embodiment preferably is an all-solid-state battery having a solid electrolyte layer between a pair of electrode layers, wherein the positive electrode active material layer and the negative electrode active material layer constituting the pair of electrode layers contain lithium vanadium phosphate, the lithium vanadium phosphate contains a polyphosphate compound containing Li and V, the lithium vanadium phosphate contains $Li_3V_2(PO_4)_3$ as a main phase, and the lithium vanadium phosphate contains 1.0% by weight or more and 15.0% by weight or less of $Li_3PO_4$ relative to $Li_3V_2(PO_4)_3$.

According to this constitution, by using the positive electrode active material layer and the negative electrode active material layer described above, $Li_3PO_4$ present in a grain boundary portion of both active material layers can alleviate a structural disorder generated at a grain boundary interface, and thus a uniform grain boundary can be formed. Hence, reduction in lithium ion conduction between the crystal grains can be suppressed, high ion conduction can be achieved, and a high capacity can be realized.

Moreover, $Li_3V_2(PO_4)_3$ which is used as the lithium vanadium phosphate of the present embodiment can be distinguished from $Li_3PO_4$ and lithium iron phosphate by performing an X-ray diffraction method on a material. ICDD Card No. 01-072-7074 is used for the lithium vanadium phosphate, ICDD Card No. 01-071-5981 is used for $Li_3PO_4$, and ICDD Card No. 01-070-6684 is used for the lithium iron phosphate. Additionally, a ratio of the above compounds can be calculated by using the Reference Intensity Ratio recorded in the ICDD Card.

In addition, the solid electrolyte layer in the all-solid-state battery of the present embodiment preferably contains lithium aluminum titanium phosphate.

According to this constitution, when a solid electrolyte containing the lithium aluminum titanium phosphate is used for the solid electrolyte layer, since the solid electrolyte has a high ion conductivity, movement of the lithium ion becomes easy even between the positive electrode and the negative electrode, and thus a higher capacity can be realized. Further, since the lithium vanadium phosphate active material and the solid electrolyte containing the lithium aluminum titanium phosphate in the present embodiment are homogeneous polyphosphate based ceramics, a non-uniform grain boundary such as one that hinders the lithium ion movement is difficult to be formed at an interface there between, thereby improving charge and discharge capacity.

In the all-solid-state battery of the present invention, $Li_fAl_gTi_hP_iO_j$ having a high lithium ion conductivity is preferably used as the lithium aluminum titanium phosphate described above (wherein f, g, h, i, and j are numbers respectively satisfying $0.5 \leq f \leq 3.0$, $0.0 < g \leq 1.0$, $1.0 \leq h \leq 2.0$, $2.8 \leq i \leq 3.2$, and $9.25 < j \leq 15.0$).

According to this constitution, as $Li_fAl_gTi_hP_iO_j$ (wherein f, g, h, i and j are numbers respectively satisfying $0.5 \leq f \leq 3.0$, $0.0 < g \leq 1.0$, $1.0 \leq h \leq 2.0$, $2.8 \leq i \leq 3.2$, and $9.25 < j \leq 15.0$) having a high lithium ion conductivity is used as the lithium aluminum titanium phosphate, a higher charge and discharge capacity can be obtained.

(Production Method of a Ceramic Material)

The lithium vanadium phosphate material of the present embodiment can be obtained by subjecting a heat treatment to a mixed raw material formed by mixing a Li compound, a V compound, and a phosphate compound or a Li phosphate compound. Additionally, the lithium vanadium phosphate material also can be obtained by adding and mixing $Li_3PO_4$ into the mixed raw material after the heat treatment. Further, the lithium aluminum titanium phosphate material can be obtained by subjecting a heat treatment to a mixed raw material formed by mixing a Li compound, an Al compound, a Ti compound, and a phosphate compound or a Ti phosphate compound.

The above-described Li compound may be, for example, LiOH or a hydrate thereof, $Li_2CO_3$, $LiNO_3$, $CH_3COOLi$, or the like. The above-described V compound may be, for example, $V_2O_3$, $V_2O_5$, or the like. The above-described phosphate compound may be, for example, $H_3PO_4$, $NH_4H_2PO_4$, $(NH_4)_2HPO_4$, or the like. Further, the above-described Li phosphate compound may be, for example, $LiPO_3$, $Li_3PO_4$, $Li_4P_2O_7$, $Li_5P_3O_{10}$, $Li_6P_4O_{14}$, or the like.

In addition, the above-described Al compound may be, for example, $Al_2O_3$, $Al(OH)_3$, $Al_2(SO_4)_3$, or the like. The above-described Ti compound may be, for example, $TiO_2$, $Ti_2O_3$, $TiCl_4$, $Ti(OR)_4$, or the like. The above-described Ti phosphate compound may be, for example, $TiP_2O_7$, $Ti_3P_4O_{16}$, or the like.

An example of a production method of the lithium vanadium phosphate of the present embodiment is illustrated. In the production method of the compound, (a) a raw material mixing process is first performed, then (b) a heat treatment process is performed, and finally (c) a pulverization process is performed. These processes are successively described below.

(a) Raw Material Mixing Process

In the raw material mixing process, with respect to the lithium vanadium phosphate, the method in which starting materials are respectively weighed in such a manner that amounts of Li and P are greater than those of stoichiometric composition thereof and then mixed, or the method in which $Li_3PO_4$ is added to the lithium vanadium phosphate of stoichiometric composition and then mixed can be adopted. Further, a carbonate, a sulfate, a nitrate, an oxalate, a chloride, a hydroxide, an oxide, a phosphate, or the like of each element can be adopted as the starting material. Among them, an oxide or a raw material which has been obtained as lithium phosphate does not generate an undesired gas during the heat treatment and thus is preferable, and a carbonate which generates carbon dioxide or a hydroxide which generates water vapor after thermal decomposition is more preferable. The mixing process may be performed by dry mixing and pulverizing without a solvent, or may be performed by wet mixing and pulverizing in a solvent, but from the viewpoint of improving mixing performance, the wet mixing and pulverizing in a solvent is preferable. For example, a planetary mill, an attritor, a ball mill, or the like can be used in the mixing process. As for the solvent, a solvent in which Li is difficult to dissolve is preferable, and an organic solvent such as ethanol is more preferable. The mixing time depends on the mixing amount, but it can be set to be, for example, 1 hour to 32 hours. In addition, with respect to the lithium aluminum titanium phosphate, the method in which starting materials are weighed so as to achieve desired composition and then mixed by means of any method also can be adopted.

(b) Calcination Process

In the calcination process, with respect to the lithium vanadium phosphate, a mixed powder obtained in the mixing process is calcined. In this case, calcination temperature is preferably the temperature (at which change of the state of the starting material (for example, phase change or the like) occurs) or above. For example, when $Li_2CO_3$ is used as one of the starting materials, the calcination temperature is preferably the temperature (at which the carbonate decomposes to generate the desired lithium vanadium phosphate phase) or above. Specifically, the calcination temperature is preferably set to be 600° C. to 1000° C. In addition, a calcination atmosphere is preferably an inert gas atmosphere or a reducing gas atmosphere. Further, with respect to the lithium aluminum titanium phosphate, a mixed powder obtained in the mixing process is also calcined. Specifically, the calcination temperature is preferably set to be 800° C. to 1000° C. In addition, the calcination atmosphere is preferably the one in which titanium is not reduced, and specifically, is preferably an air atmosphere.

(c) Pulverization Process

The pulverization process is a process of producing a powder having an appropriate particle size and distribution from the material obtained after reacting and agglutinating during the calcination process. The pulverization may be performed by dry pulverization without a solvent, or may be performed by wet pulverization in a solvent. For example, a planetary mill, an attritor, a ball mill, or the like can be adopted in the pulverization process. In order that the lithium vanadium phosphate is more stably pulverized, the solvent is preferably an organic solvent such as ethanol. Although pulverization time depends on the pulverization amount, it can be set to be, for example, 0.5 hour to 32 hours.

Further, pulverization may be performed after $Li_3PO_4$ is added to a calcined product obtained in the calcination process.

According to the production method described above, since the mixed powder of the starting materials is calcined at a relatively low temperature, composition deviation can be precisely suppressed. Additionally, the method for producing the lithium vanadium phosphate of the present invention is not limited thereto, and other production methods may also be employed.

The all-solid-state battery of the present embodiment is formed by laminating the positive electrode layer 2 and the negative electrode layer 3 via the all-solid-state electrolyte layer 4, the positive electrode layer 2 is composed of the package layer 5, the positive electrode current collector layer 6 and the positive electrode active material layer 7, and the negative electrode layer 3 is composed of the negative electrode active material layer 8, the negative electrode current collector layer 9 and the package layer 5. The positive electrode current collector layer 6 and the negative electrode current collector layer 9 can contain a conventionally known current collector used in a lithium secondary battery and can be produced by a common method.

(Current Collector)

As a material constituting the current collector layer of the all-solid-state battery of the present embodiment, a material having a high electric conductivity is preferably used; for example, silver, palladium, gold, platinum, aluminum, copper, nickel or the like is preferable. In particular, copper is less likely to react with the lithium aluminum titanium phosphate, and is also effective in reducing the internal resistance of the all-solid-state battery; therefore, copper is preferable. Further, the material constituting the current collector layer in the positive electrode layer and the negative electrode layer may be the same or different.

In addition, the positive electrode current collector layer and the negative electrode current collector layer of the all-solid-state battery of the present embodiment preferably contain the positive electrode active material and the negative electrode active material respectively.

In the situation that the positive electrode current collector layer and the negative electrode current collector layer contain the positive electrode active material and the negative electrode active material respectively, the adhesion between the positive electrode current collector layer and the positive electrode active material layer and the adhesion between the negative electrode current collector layer and the negative electrode active material layer are improved, and thus the situation is preferable.

(Production Method of all-Solid-State Battery)

The all-solid-state battery of the present embodiment can be produced by making each material of the positive electrode current collector layer, the positive electrode active material layer, the solid electrolyte layer, the negative electrode active material layer, and the negative electrode current collector layer into paste; coating and drying to form green sheets; laminating the green sheets to prepare a laminated body; and then firing the obtained laminated body.

The method for making paste is not particularly limited. For example, a powder of each of the above materials may be mixed into a vehicle to obtain a paste. Here, the vehicle is a generic term for medium in a liquid phase. The vehicle contains a solvent and a binder. A paste for the positive electrode current collector layer, a paste for the positive electrode active material layer, a paste for the solid electrolyte layer, a paste for the negative electrode active material layer, and a paste for the negative electrode current collector layer can be produced by the above-mentioned method.

The prepared pastes are coated on a substrate such as PET in a predetermined order, and dried if necessary, and then the substrate is peeled off to prepare a green sheet. The method for coating the paste is not particularly limited, and a known method such as screen printing, coating, transfer printing, or doctor blade method can be employed.

The produced green sheets are laminated in a predetermined order and in a predetermined layer number, and then alignment, cutting and the like are performed as needed to prepare a laminated block. In the case of producing a parallel type or series-parallel type battery, it is preferable to perform alignment and then laminate so that the end face of the positive electrode layer and the end face of the negative electrode layer are not aligned.

During producing a laminated block, a active material unit described below may be prepared to produce the laminated block.

In the production method, first, the paste for the solid electrolyte is formed into a sheet by a doctor blade method on a PET film to obtain the solid electrolyte sheet, after that, the paste for the positive electrode active material layer is printed on the solid electrolyte layer sheet by screen printing and then dried. Next, the paste for the positive electrode current collector layer is printed thereon by screen printing and then dried. Further, the paste for the positive electrode active material is printed thereon again by screen printing, and dried, and then the PET film is peeled off to obtain the positive electrode layer unit. In this way, the positive electrode layer unit in which the paste for the positive electrode active material layer, the paste for the positive electrode current collector layer, and the paste for the positive electrode active material layer are successively formed on the solid electrolyte sheet is obtained. The negative electrode layer unit in which the paste for the negative electrode active material layer, the paste for the negative electrode current collector layer, and the paste for the negative electrode active material layer are successively formed on the solid electrolyte sheet is obtained in the same manner.

A positive electrode layer unit and a negative electrode layer unit are laminated in such a manner that the solid electrolyte sheet is sandwiched there between. At that time, the units are laminated in a staggered manner by the way of making the positive electrode current collector layer of the positive electrode layer unit extend only to one end face and making the negative electrode current collector layer of the negative electrode layer unit extend only to the other face. The solid electrolyte sheets having a predetermined thickness are further laminated on both faces of the laminated unit to produce a laminated block.

The resulting laminated blocks are bonded together under pressure. The bonding is carried out under pressure while heating and the heating temperature is set to be, for example, 40° C. to 95° C.

The bonded laminated block is heated to 500° C. to 750° C. in an atmosphere of, for example, nitrogen, hydrogen, and water vapor to remove the binder. Thereafter, the laminated block is heated to 600° C. to 1100° C. in a nitrogen atmosphere to form a firing process. The firing time is set to be, for example, 0.1 to 3 hours. The laminated body is accomplished by the firing process.

The pair of electrode layers and the solid electrolyte layer (which is disposed between the pair of electrode layers) of the laminated body after being sintered have a relative density of 80% or above. When the relative density is high, the diffusion path of the movable ions in the crystal will be easily connected, and the ion conductivity can be improved.

EXAMPLES

Example 1

The contents of the present invention will be described in detail with reference to Examples and Comparative Examples, but the present invention is not limited to the following examples.

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. First, the starting materials were mixed and pulverized in ethanol for 16 hours by using a ball mill (120 rpm/zirconia ball) after weighed. After separated from the ball and ethanol and then dried, a mixed powder of the starting materials was calcined by using a magnesia-made crucible. The calcination was performed in a reducing atmosphere at 850° C. for 2 hours. Thereafter, the calcined powder was pulverized in ethanol for 16 hours by using a ball mill (120 rpm/zirconia ball). The lithium vanadium phosphate powder was obtained after the pulverized powder was separated from the ball and ethanol and then dried. By using X'Pert PRO MPD manufactured by PANalytical and using Reference Intensity Ratio recorded in ICDD Card, a ratio between $Li_3V_2(PO_4)_3$ and $Li_3PO_4$ was calculated by means of X-ray diffraction. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Positive Electrode Active Material Layer and Paste for Negative Electrode Active Material Layer)

The pastes for the positive electrode active material layer and the negative electrode active material layer were produced by adding 15 parts of ethyl cellulose used as a binder and 65 parts of dihydroterpineol used as a solvent to 100 parts of the lithium vanadium phosphate powder, and then kneading and dispersing the mixture by using a three-roll mill.

(Production of Paste for Solid Electrolyte Layer)

As the solid electrolyte, $Li_fAl_gTi_hP_iO_j$ (wherein f=1.3, g=0.3, h=1.7, i=3.0, and j=12.0) produced by the following method was used. $Li_2CO_3$, $Al_2O_3$, $TiO_2$, and $NH_4H_2PO_4$ were used as starting materials, ethanol was used as a solvent, and wet mixing was performed for 16 hours by using a ball mill. After separated from the ball and ethanol and then dried, the mixed powder of the starting materials was calcined in an alumina-made crucible in the air at 850° C. for 2 hours. Thereafter, the calcined powder was pulverized in ethanol for 16 hours by using a ball mill (120 rpm/zirconia ball). The pulverized powder was separated from the ball and ethanol and then dried to obtain a powder. Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 μm.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

A charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 1. A threshold of discharge performance sufficient for use was 2.5 µAh.

Example 2

In order to verify the effect of the present embodiment, raw materials were weighed in such a manner that the lithium vanadium phosphate became $Li_{3.20}V_{2.00}(PO_4)_{3.07}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 2.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Example 3

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Example 4

In order to verify the effect of the present embodiment, raw materials were weighed in such a manner that the lithium vanadium phosphate became $Li_{3.80}V_{2.00}(PO_4)_{3.30}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 8.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Example 5

In order to verify the effect of the present embodiment, raw materials were weighed in such a manner that the lithium vanadium phosphate became $Li_{4.60}V_{2.00}(PO_4)_{3.53}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 13.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Example 6

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 1

In this Comparative Example, raw materials were weighed in such a manner that the lithium vanadium phosphate became $Li_{2.90}V_{2.00}(PO_4)_{2.97}$. As starting materials, $Li_2CO_3$, $LiPO_3$, $V_2O_3$, and $NH_4H_2PO_4$ were used. The lithium vanadium phosphate powder was obtained by the same method as that in Example 1.

Thereafter, evaluation was performed by the same X-ray diffraction method as that in Example 1. As a result, it could be confirmed that 0.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 2

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 3

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 4

Further, the case that the lithium iron phosphate (which was regarded as polyphosphate compound) was used instead of the lithium vanadium phosphate was shown in this Comparative Example.

The raw materials were weighed in such a manner that the lithium iron phosphate became $Li_{1.04}Fe_{1.00}P_{1.01}O_{4.05}$. As starting materials, $Li_2CO_3$, FeO, and $NH_4H_2PO_4$ were used. First, the starting materials were mixed and pulverized in ethanol for 16 hours by using a ball mill (120 rpm/zirconia ball) after weighed. After separated from the ball and ethanol and then dried, a mixed powder of the starting materials was calcined by using a magnesia-made crucible. The calcination was performed in a reducing atmosphere at 800° C. for 2 hours. Thereafter, the calcined powder was pulverized in ethanol for 16 hours by using a ball mill (120 rpm/zirconia ball). The lithium iron phosphate powder was obtained after the pulverized powder was separated from the ball and ethanol and then dried. By using X'Pert PRO MPD manufactured by PANalytical and using Reference Intensity Ratio recorded in ICDD Card, a ratio between $LiFePO_4$ and $Li_3PO_4$ was calculated by means of X-ray diffraction. As a result, it could be confirmed that 1.0% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 5

The raw materials were weighed in such a manner that the lithium iron phosphate became $Li_{1.30}Fe_{1.00}P_{1.11}O_{4.40}$. As starting materials, $Li_2CO_3$, FeO, and $NH_4H_2PO_4$ were used. The lithium iron phosphate powder was obtained by the same method as that in Comparative Example 4. By using X'Pert PRO MPD manufactured by PANalytical and using Reference Intensity Ratio recorded in ICDD Card, a ratio between $LiFePO_4$ and $Li_3PO_4$ was calculated by means of X-ray diffraction. As a result, it could be confirmed that 7.5% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

Comparative Example 6

The raw materials were weighed in such a manner that the lithium iron phosphate became $Li_{1.65}Fe_{1.00}P_{1.16}O_{4.90}$. As starting materials, $Li_2CO_3$, FeO, and $NH_4H_2PO_4$ were used. The lithium iron phosphate powder was obtained by the same method as that in Comparative Example 4. By using X'Pert PRO MPD manufactured by PANalytical and using Reference Intensity Ratio recorded in ICDD Card, a ratio between $LiFePO_4$ and $Li_3PO_4$ was calculated by means of X-ray diffraction. As a result, it could be confirmed that 14.3% by weight of $Li_3PO_4$ was contained. Further, the lithium aluminum titanium phosphate powder was obtained by the same method as that in Example 1, and then the laminated product was produced by the same method. Further, de-bindering and sintering were performed by the same method to obtain the all-solid-state battery. The discharge performance of the laminated product was evaluated by the same method as that in Example 1. The result of the measured discharge capacity was shown in Table 1.

It could be known from Table 1 that the all-solid-state battery produced by applying the lithium vanadium phosphate containing $Li_3PO_4$ with an amount range of the present invention to the active material layer could achieve a significantly higher discharge capacity.

TABLE 1

| | Main phase | $Li_3PO_4$ (wt %) | $Li_fAl_gTi_hP_iO_j$ | | | | | Discharge capacity of the produced battery (μAh) |
| --- | --- | --- | --- | --- | --- | --- | --- | --- |
| | | | f | g | h | i | j | |
| Example 1 | $Li_3V_2(PO_4)_3$ | 1.0 | 1.30 | 0.30 | 1.70 | 3.00 | 12.00 | 3.05 |
| Example 2 | $Li_3V_2(PO_4)_3$ | 2.0 | 1.30 | 0.30 | 1.70 | 3.00 | 12.00 | 3.20 |
| Example 3 | $Li_3V_2(PO_4)_3$ | 5.0 | 1.30 | 0.30 | 1.70 | 3.00 | 12.00 | 4.25 |
| Example 4 | $Li_3V_2(PO_4)_3$ | 8.0 | 1.30 | 0.30 | 1.70 | 3.00 | 12.00 | 5.13 |
| Example 5 | $Li_3V_2(PO_4)_3$ | 13.0 | 1.30 | 0.30 | 1.70 | 3.00 | 12.00 | 4.67 |
| Example 6 | $Li_3V_2(PO_4)_3$ | 15.0 | 1.30 | 0.30 | 1.70 | 3.00 | 12.00 | 4.08 |
| Comparative Example 1 | $Li_3V_2(PO_4)_3$ | 0.0 | 1.30 | 0.30 | 1.70 | 3.00 | 12.00 | 2.14 |
| Comparative Example 2 | $Li_3V_2(PO_4)_3$ | 0.8 | 1.30 | 0.30 | 1.70 | 3.00 | 12.00 | 2.28 |
| Comparative Example 3 | $Li_3V_2(PO_4)_3$ | 16.0 | 1.30 | 0.30 | 1.70 | 3.00 | 12.00 | 1.80 |
| Comparative Example 4 | $LiFePO_4$ | 1.0 | 1.30 | 0.30 | 1.70 | 3.00 | 12.00 | 1.39 |
| Comparative Example 5 | $LiFePO_4$ | 7.5 | 1.30 | 0.30 | 1.70 | 3.00 | 12.00 | 2.33 |
| Comparative Example 6 | $LiFePO_4$ | 14.5 | 1.30 | 0.30 | 1.70 | 3.00 | 12.00 | 1.85 |

Example 7

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=1.02, g=0.13, h=1.91, i=3.0, and j=12.03) was used. $Li_2CO_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 2. A threshold of discharge performance sufficient for use was 2.5 µAh.

Example 8

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 7, and then the laminated product was produced by the same method. Further, de-bindering and sintering were performed by the same method to obtain the all-solid-state battery. The discharge performance of the laminated product was evaluated by the same method as that in Example 7. The result of the measured discharge capacity was shown in Table 2.

Example 9

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 7, and then the laminated product was produced by the same method. Further, de-bindering and sintering were performed by the same method to obtain the all-solid-state battery. The discharge performance of the laminated product was evaluated by the same method as that in Example 7. The result of the measured discharge capacity was shown in Table 2.

Comparative Example 7

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 7, and then the laminated product was produced by the same method. Further, de-bindering and sintering were performed by the same method to obtain the all-solid-state battery. The discharge performance of the laminated product was evaluated by the same method as that in Example 7. The result of the measured discharge capacity was shown in Table 2.

Comparative Example 8

In this Comparative Example, raw materials were weighed in such a manner that the lithium vanadium phosphate became $Li_{1.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 7, and then the laminated product was produced by the same method. Further, de-bindering and sintering were performed by the same method to obtain the all-solid-state battery. The discharge performance of the laminated product was evaluated by the same method as that in Example 7. The result of the measured discharge capacity was shown in Table 2.

Example 10

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=1.5, g=0.5, h=1.5, i=3.0, and j=12.0) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 µm, and then dried at 80° C. for 10 minutes. Next, the paste for the electrode active material layer was printed thereon by screen printing with a thickness of 5 µm, and then dried at 80° C. for 10 minutes to obtain the positive electrode layer unit. On the other hand, the paste for the negative electrode active material layer was printed on the sheet for the solid electrolyte layer by screen printing with a thickness of 5 µm, and then dried at 80° C. for 10 minutes. Next, the paste for the negative electrode current collector layer was printed thereon by screen printing with a thickness of 5 µm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 2. A threshold of discharge performance sufficient for use was 2.5 µAh.

Example 11

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 10, and then the laminated product was produced by the same method. Further, de-bindering and sintering were performed by the same method to obtain the all-solid-state battery. The discharge performance of the laminated product was evaluated by the same method as that in Example 10. The result of the measured discharge capacity was shown in Table 2.

Example 12

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 10, and then the laminated product was produced by the same method. Further, de-bindering and sintering were performed by the same method to obtain the all-solid-state battery. The discharge performance of the laminated product was evaluated by the same method as that in Example 10. The result of the measured discharge capacity was shown in Table 2.

Comparative Example 9

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 10, and then the laminated product was produced by the same method. Further, de-bindering and sintering were performed by the same method to obtain the all-solid-state battery. The discharge performance of the laminated product was evaluated by the same method as that in Example 10. The result of the measured discharge capacity was shown in Table 2.

Comparative Example 10

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 10, and then the laminated product was produced by the same method. Further, de-bindering and sintering were performed by the same method to obtain the all-solid-state battery. The discharge performance of the laminated product was evaluated by the same method as that in Example 10. The result of the measured discharge capacity was shown in Table 2.

Example 13

(Production of Positive Electrode Active Material) In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=2.0, g=1.0, h=1.0, i=3.0, and j=12.0) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 14

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 13, and then the laminated product was produced by the same method. Further, de-bindering and sintering were performed by the same method to obtain the all-solid-state battery. The discharge performance of the laminated product was evaluated by the same method as that in Example 13. The result of the measured discharge capacity was shown in Table 2.

Example 15

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 13, and then the laminated product was produced by the same method. Further, de-bindering and sintering were performed by the same method to obtain the all-solid-state battery. The discharge performance of the laminated product was evaluated by the same method as that in Example 13. The result of the measured discharge capacity was shown in Table 2.

Comparative Example 11

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 13, and then the laminated product was produced by the same method. Further, de-bindering and sintering were performed by the same method to obtain the all-solid-state battery. The discharge performance of the laminated product was evaluated by the same method as that in Example 13. The result of the measured discharge capacity was shown in Table 2.

Comparative Example 12

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 13, and then the laminated product was produced by the same method. Further, de-bindering and sintering were performed by the same method to obtain the all-solid-state battery. The discharge performance of the laminated product was evaluated by the same method as that in Example 13. The result of the measured discharge capacity was shown in Table 2.

Example 16

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=2.1, g=1.1, h=0.9, i=3.0, and j=12.0) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 µm, and then dried at 80° C. for 10 minutes. Next, the paste for the electrode active material layer was printed thereon by screen printing with a thickness of 5 µm, and then dried at 80° C. for 10 minutes to obtain the positive electrode layer unit. On the other hand, the paste for the negative electrode active material layer was printed on the sheet for the solid electrolyte layer by screen printing with a thickness of 5 jam, and then dried at 80° C. for 10 minutes. Next, the paste for the negative electrode current collector layer was printed thereon by screen printing with a thickness of 5 jam, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 17

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 16, and then the laminated product was produced by the same method. Further, de-bindering and sintering were performed by the same method to obtain the all-solid-state battery. The discharge performance of the laminated product was evaluated by the same method as that in Example 16. The result of the measured discharge capacity was shown in Table 2.

Example 18

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 16, and then the laminated product was produced by the same method. Further, de-bindering and sintering were performed by the same method to obtain the all-solid-state battery. The discharge performance of the laminated product was evaluated by the same method as that in Example 16. The result of the measured discharge capacity was shown in Table 2.

Example 19

(Production of Positive Electrode Active Material) In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=0.5, g=0.02, h=1.0, i=2.8, and j=9.28) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 2. A threshold of discharge performance sufficient for use was 2.5 µAh.

Example 20

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 19, and then the laminated product was produced by the same method. Further, de-bindering and sintering were performed by the same method to obtain the all-solid-state battery. The discharge performance of the laminated product was evaluated by the same method as that in Example 19. The result of the measured discharge capacity was shown in Table 2.

Example 21

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 19, and then the laminated product was produced by the same method. Further, de-bindering and sintering were performed by the same method to obtain the all-solid-state battery. The discharge performance of the laminated product was evaluated by the same method as that in Example 19. The result of the measured discharge capacity was shown in Table 2.

Comparative Example 13

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 19, and then the laminated product was produced by the same method. Further, de-bindering and sintering were performed by the same method to obtain the all-solid-state battery. The discharge performance of the laminated product was evaluated by the same method as that in Example 19. The result of the measured discharge capacity was shown in Table 2.

Comparative Example 14

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 19, and then the laminated product was produced by the same method. Further, de-bindering and sintering were performed by the same method to obtain the all-solid-state battery. The discharge performance of the laminated product was evaluated by the same method as that in Example 19. The result of the measured discharge capacity was shown in Table 2.

Example 22

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=0.5, g=0.02, h=2.0, i=3.2, and j=12.28) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 23

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 22, and then the laminated product was produced by the same method. Further, de-bindering and sintering were performed by the same method to obtain the all-solid-state battery. The discharge performance of the laminated product was evaluated by the same method as that in Example 22. The result of the measured discharge capacity was shown in Table 2.

Example 24

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 22, and then the laminated product was produced by the same method. Further, de-bindering and sintering were performed by the same method to obtain the all-solid-state battery. The discharge performance of the laminated product was evaluated by the same method as that in Example 22. The result of the measured discharge capacity was shown in Table 2.

Example 25

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=0.5, g=1.0, h=1.0, i=2.8, and j=10.75) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 26

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 25, and then the laminated product was produced by the same method. Further, de-bindering and sintering were performed by the same method to obtain the all-solid-state battery. The discharge performance of the laminated product was evaluated by the same method as that in Example 25. The result of the measured discharge capacity was shown in Table 2.

Example 27

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 25, and then the laminated product was produced by the same method. Further, de-bindering and sintering were performed by the same method to obtain the all-solid-state battery. The discharge performance of the laminated product was evaluated by the same method as that in Example 25. The result of the measured discharge capacity was shown in Table 2.

Example 28

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=0.5, g=1.0, h=2.0, i=3.2, and j=13.75) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 29

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 28, and then the laminated product was produced by the same method. Further, de-bindering and sintering were performed by the same method to obtain the all-solid-state battery. The discharge performance of the laminated product was evaluated by the same method as that in Example 28. The result of the measured discharge capacity was shown in Table 2.

Example 30

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 28, and then the laminated product was produced by the same method. Further, de-bindering and sintering were performed by the same method to obtain the all-solid-state battery. The discharge performance of the laminated product was evaluated by the same method as that in Example 28. The result of the measured discharge capacity was shown in Table 2.

Comparative Example 15

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 28, and then the laminated product was produced by the same method. Further, de-bindering and sintering were performed by the same method to obtain the all-solid-state battery. The discharge performance of the laminated product was evaluated by the same method as that in Example 28. The result of the measured discharge capacity was shown in Table 2.

Comparative Example 16

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 28, and then the laminated product was produced by the same method. Further, de-bindering and sintering were performed by the same method to obtain the all-solid-state battery. The discharge performance of the laminated product was evaluated by the same method as that in Example 28. The result of the measured discharge capacity was shown in Table 2.

Example 31

(Production of Positive Electrode Active Material)
In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)
As the negative electrode active material, the same powder as that of the positive electrode active material described above was used.

(Production of Paste for Solid Electrolyte Layer)
As the solid electrolyte, $Li_fAl_gTi_hP_iO_j$ (wherein f=3.0, g=0.1, h=1.0, i=2.8, and j=10.65) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)
A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)
Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)
The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)
The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)
The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)
The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V. The result of the measured discharge capacity was shown in Table 2. A threshold of discharge performance sufficient for use was 2.5 μAh.

Example 32

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained.

Further, the lithium aluminum titanium phosphate powder was obtained by the same method as that in Example 31, and then the laminated product was produced by the same method. Further, de-bindering and sintering were performed by the same method to obtain the all-solid-state battery. The discharge performance of the laminated product was evaluated by the same method as that in Example 31. The result of the measured discharge capacity was shown in Table 2.

Example 33

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 31, and then the laminated product was produced by the same method. Further, de-bindering and sintering were performed by the same method to obtain the all-solid-state battery. The discharge performance of the laminated product was evaluated by the same method as that in Example 31. The result of the measured discharge capacity was shown in Table 2.

Comparative Example 17

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 31, and then the laminated product was produced by the same method. Further, de-bindering and sintering were performed by the same method to obtain the all-solid-state battery. The discharge performance of the laminated product was evaluated by the same method as that in Example 31. The result of the measured discharge capacity was shown in Table 2.

Comparative Example 18

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 31, and then the laminated product was produced by the same method. Further, de-bindering and sintering were performed by the same method to obtain the all-solid-state battery. The discharge performance of the laminated product was evaluated by the same method as that in Example 31. The result of the measured discharge capacity was shown in Table 2.

Example 34

(Production of Positive Electrode Active Material)
In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)
As the negative electrode active material, the same powder as that of the positive electrode active material described above was used.

(Production of Paste for Solid Electrolyte Layer)
As the solid electrolyte, $Li_fAl_gTi_hP_iO_j$ (wherein f=3.0, g=0.1, h=2.0, i=3.2, and j=13.65) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.
Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)
A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)
Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit) The paste for the electrode current collector layer was printed on the sheet for the solid electrolyte layer described above by screen printing with a thickness of 5 jam, and then dried at 80° C. for 10 minutes. Next, the paste for the electrode active material layer was printed thereon by screen printing with a thickness of 5 jam, and then dried at 80° C. for 10 minutes to obtain the positive electrode layer unit. On the other hand, the paste for the negative electrode active material layer was printed on the sheet for the solid electrolyte layer by screen printing with a thickness of 5 jam, and then dried at 80° C. for 10 minutes. Next, the paste for the negative electrode current collector layer was printed thereon by screen printing with a thickness of 5 jam, and then dried at 80° C. for 10 minutes to obtain the negative electrode layer unit. Next, the PET film was peeled off.

(Production of Laminated Body)
The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 μA and a voltage of 0 V to 1.8 V The result of the measured discharge capacity was shown in Table 2. A threshold of discharge performance sufficient for use was 2.5 μAh.

Example 35

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 34, and then the laminated product was produced by the same method. Further, de-bindering and sintering were performed by the same method to obtain the all-solid-state battery. The discharge performance of the laminated product was evaluated by the same method as that in Example 34. The result of the measured discharge capacity was shown in Table 2.

Example 36

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 34, and then the laminated product was produced by the same method. Further, de-bindering and sintering were performed by the same method to obtain the all-solid-state battery. The discharge performance of the laminated product was evaluated by the same method as that in Example 34. The result of the measured discharge capacity was shown in Table 2.

Example 37

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=3.0, g=1.0, h=1.0, i=2.8, and j=12.0) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 am.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 μm, and then dried at 80° C. for 10 minutes. Next, the paste for the electrode active material layer was printed thereon by screen printing with a thickness of 5 μm, and then dried at 80° C. for 10 minutes to obtain the positive electrode layer unit. On the other hand, the paste for the negative electrode active material layer was printed on the sheet for the solid electrolyte layer by screen printing with a thickness of 5 μm, and then dried at 80° C. for 10 minutes. Next, the paste for the negative electrode current collector layer was printed thereon by screen printing with a thickness of 5 μm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 2. A threshold of discharge performance sufficient for use was 2.5 µAh.

Example 38

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 37, and then the laminated product was produced by the same method. Further, de-bindering and sintering were performed by the same method to obtain the all-solid-state battery. The discharge performance of the laminated product was evaluated by the same method as that in Example 37. The result of the measured discharge capacity was shown in Table 2.

Example 39

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 37, and then the laminated product was produced by the same method. Further, de-bindering and sintering were performed by the same method to obtain the all-solid-state battery. The discharge performance of the laminated product was evaluated by the same method as that in Example 37. The result of the measured discharge capacity was shown in Table 2.

Example 40

(Production of Positive Electrode Active Material)

In order to verify the effect of the present embodiment, raw materials were weighed in such a manner that the lithium vanadium phosphate became $Li_{3.10}V_{2.00}(PO_4)_{3.03}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 1.0% by weight of $Li_3PO_4$ was contained.

(Production of Negative Electrode Active Material)

As the negative electrode active material, the same powder as that of the positive electrode active material described above was used.

(Production of Paste for Solid Electrolyte Layer)

As the solid electrolyte, $Li_fAl_gTi_hP_iO_j$ (wherein f=3.0, g=1.0, h=2.0, i=3.2, and j=15.0) was used. $Li_2CO_3$, $Al_2O_3$, $TiO_2$, and $NH_4H_2PO_4$ were used as starting materials, and the lithium aluminum titanium phosphate powder was obtained by the same method as that in Example 1.

Next, 100 parts of ethanol and 200 parts of toluene which were used as a solvent were added to 100 parts of the powder, and then wet mixing was performed by using a ball mill. Thereafter, 16 parts of polyvinyl butyral binder and 4.8 parts of benzyl butyl phthalate were further added and then mixed to prepare the paste for the solid electrolyte layer.

(Production of Sheet for Solid Electrolyte Layer)

A PET film was used as a substrate, and then the paste for the solid electrolyte layer was molded into a sheet by doctor blade method to obtain a sheet for the solid electrolyte layer having a thickness of 15 m.

(Production of Paste for Positive Electrode Current Collector Layer and Paste for Negative Electrode Current Collector Layer)

Cu powder and the lithium vanadium phosphate powder were mixed at a weight ratio of 100:9, then 10 parts of ethyl cellulose used as a binder and 50 parts of dihydroterpineol used as a solvent were added, and then mixed and dispersed by using a three-roll mill to produce the pastes for the current collector layer.

(Production of Active Material Unit)

The paste for the electrode current collector layer was printed on the sheet for the solid electrolyte layer described above by screen printing with a thickness of 5 µm, and then dried at 80° C. for 10 minutes. Next, the paste for the electrode active material layer was printed thereon by screen printing with a thickness of 5 µm, and then dried at 80° C. for 10 minutes to obtain the positive electrode layer unit. On the other hand, the paste for the negative electrode active material layer was printed on the sheet for the solid electrolyte layer by screen printing with a thickness of 5 µm, and then dried at 80° C. for 10 minutes. Next, the paste for the negative electrode current collector layer was printed thereon by screen printing with a thickness of 5 µm, and then dried at 80° C. for 10 minutes to obtain the negative electrode layer unit. Next, the PET film was peeled off.

(Production of Laminated Body)

The positive electrode layer unit, the negative electrode layer unit, and the sheet for the solid electrolyte layer were laminated in a way that the solid electrolyte layer, the positive electrode current collector layer, the positive electrode active material layer, the solid electrolyte layer, the negative electrode active material layer, the negative electrode current collector layer, and the solid electrolyte layer were formed in sequence to obtain a laminated product. At that time, the units were laminated in a staggered manner by the way of making the positive electrode current collector layer of the positive electrode layer unit extend only to one end face, and making the negative electrode current collector layer of the negative electrode layer unit extend only to the opposite face. Thereafter, the laminated product was molded by means of thermo compression bonding and then cut to produce the laminated body.

(Production of Sintered Body)

The obtained laminated body was subjected to a de-bindering process, and then simultaneously fired to obtain a sintered body. In the de-bindering process, the obtained laminated body was heated to a firing temperature of 700° C. at a heating rate of 50° C./hour in nitrogen and kept at this temperature for 10 hours. In the simultaneous firing process, the obtained laminated body was heated to a firing temperature of 850° C. at a heating rate of 200° C./hour in nitrogen, and then kept at this temperature for 1 hour. After firing, the laminated body was naturally cooled. After simultaneous firing, the external size of the battery obtained was 3.2 mm×2.5 mm×0.4 mm.

(Evaluation of Charge and Discharge Performance)

The charge and discharge tester was used to measure charge and discharge capacities by mounting the obtained laminated body on a type of a jig using a spring pin for fixing. As for the measurement condition, both charge and discharge were performed at a current of 2 µA and a voltage of 0 V to 1.8 V. The result of the measured discharge capacity was shown in Table 2. A threshold of discharge performance sufficient for use was 2.5 µAh.

Example 41

In order to verify the effect of the present embodiment, raw materials were weighed in such a manner that the lithium vanadium phosphate became $Li_{3.40}V_{2.00}(PO_4)_{3.13}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 5.0% by weight of $Li_3PO_4$ was contained. Further, the lithium aluminum titanium phosphate powder was obtained by the same method as that in Example 40, and then the laminated product was produced by the same method. Further, de-bindering and sintering were performed by the same method to obtain the all-solid-state battery. The discharge performance of the laminated product was evaluated by the same method as that in Example 40. The result of the measured discharge capacity was shown in Table 2.

Example 42

In order to verify the effect of the present embodiment, raw materials were weighed in such a manner that the lithium vanadium phosphate became $Li_{4.90}V_{2.00}(PO_4)_{3.63}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 15.0% by weight of $Li_3PO_4$ was contained. Further, the lithium aluminum titanium phosphate powder was obtained by the same method as that in Example 40, and then the laminated product was produced by the same method. Further, de-bindering and sintering were performed by the same method to obtain the all-solid-state battery. The discharge performance of the laminated product was evaluated by the same method as that in Example 40. The result of the measured discharge capacity was shown in Table 2.

Comparative Example 19

In this Comparative Example, raw materials were weighed in such a manner that the lithium vanadium phosphate became $Li_{3.02}V_{2.00}(PO_4)_{3.00}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 0.8% by weight of $Li_3PO_4$ was contained. Further, the lithium aluminum titanium phosphate powder was obtained by the same method as that in Example 40, and then the laminated product was produced by the same method. Further, de-bindering and sintering were performed by the same method to obtain the all-solid-state battery. The discharge performance of the laminated product was evaluated by the same method as that in Example 40. The result of the measured discharge capacity was shown in Table 2.

Comparative Example 20

In this Comparative Example, raw materials were weighed in such a manner that the lithium vanadium phosphate became $Li_{5.00}V_{2.00}(PO_4)_{3.67}$. As starting materials, $Li_2CO_3$, $LiPO_3$, $V_2O_3$, and $NH_4H_2PO_4$ were used. The lithium vanadium phosphate powder was obtained by the same method as that in Example 1. Thereafter, evaluation was performed by the same X-ray diffraction method as that in Example 1. As a result, it could be confirmed that 16.0% by weight of $Li_3PO_4$ was contained. Further, the lithium aluminum titanium phosphate powder was obtained by the same method as that in Example 40, and then the laminated product was produced by the same method. Further, de-bindering and sintering were performed by the same method to obtain the all-solid-state battery. The discharge performance of the laminated product was evaluated by the same method as that in Example 40. The result of the measured discharge capacity was shown in Table 2.

It could be known from Table 2 that the all-solid-state battery produced by applying the lithium vanadium phosphate containing $Li_3PO_4$ with an amount range of the present invention to the active material layer could achieve a significantly higher discharge capacity.

TABLE 2

| | Main phase | Li₃PO₄ (wt %) | Li_fAl_gTi_hP_iO_j f | g | h | i | j | Discharge capacity of the produced battery (μAh) |
|---|---|---|---|---|---|---|---|---|
| Example 7 | Li$_3$V$_2$(PO$_4$)$_3$ | 1.0 | 1.02 | 0.13 | 1.91 | 3.00 | 12.03 | 3.22 |
| Example 8 | Li$_3$V$_2$(PO$_4$)$_3$ | 5.0 | 1.02 | 0.13 | 1.91 | 3.00 | 12.03 | 4.49 |
| Example 9 | Li$_3$V$_2$(PO$_4$)$_3$ | 15.0 | 1.02 | 0.13 | 1.91 | 3.00 | 12.03 | 4.32 |
| Example 10 | Li$_3$V$_2$(PO$_4$)$_3$ | 1.0 | 1.50 | 0.50 | 1.50 | 3.00 | 12.00 | 3.05 |
| Example 11 | Li$_3$V$_2$(PO$_4$)$_3$ | 5.0 | 1.50 | 0.50 | 1.50 | 3.00 | 12.00 | 4.25 |
| Example 12 | Li$_3$V$_2$(PO$_4$)$_3$ | 15.0 | 1.50 | 0.50 | 1.50 | 3.00 | 12.00 | 4.08 |
| Example 13 | Li$_3$V$_2$(PO$_4$)$_3$ | 1.0 | 2.00 | 1.00 | 1.00 | 3.00 | 12.00 | 2.51 |
| Example 14 | Li$_3$V$_2$(PO$_4$)$_3$ | 5.0 | 2.00 | 1.00 | 1.00 | 3.00 | 12.00 | 3.11 |
| Example 15 | Li$_3$V$_2$(PO$_4$)$_3$ | 15.0 | 2.00 | 1.00 | 1.00 | 3.00 | 12.00 | 3.03 |
| Example 16 | Li$_3$V$_2$(PO$_4$)$_3$ | 1.0 | 2.10 | 1.10 | 0.90 | 3.00 | 12.00 | 2.51 |
| Example 17 | Li$_3$V$_2$(PO$_4$)$_3$ | 5.0 | 2.10 | 1.10 | 0.90 | 3.00 | 12.00 | 2.91 |
| Example 18 | Li$_3$V$_2$(PO$_4$)$_3$ | 15.0 | 2.10 | 1.10 | 0.90 | 3.00 | 12.00 | 2.73 |
| Example 19 | Li$_3$V$_2$(PO$_4$)$_3$ | 1.0 | 0.50 | 0.02 | 1.00 | 2.80 | 9.28 | 2.58 |
| Example 20 | Li$_3$V$_2$(PO$_4$)$_3$ | 5.0 | 0.50 | 0.02 | 1.00 | 2.80 | 9.28 | 3.59 |
| Example 21 | Li$_3$V$_2$(PO$_4$)$_3$ | 15.0 | 0.50 | 0.02 | 1.00 | 2.80 | 9.28 | 3.45 |
| Example 22 | Li$_3$V$_2$(PO$_4$)$_3$ | 1.0 | 0.50 | 0.02 | 2.00 | 3.20 | 12.28 | 2.74 |
| Example 23 | Li$_3$V$_2$(PO$_4$)$_3$ | 5.0 | 0.50 | 0.02 | 2.00 | 3.20 | 12.28 | 3.82 |
| Example 24 | Li$_3$V$_2$(PO$_4$)$_3$ | 15.0 | 0.50 | 0.02 | 2.00 | 3.20 | 12.28 | 3.67 |
| Example 25 | Li$_3$V$_2$(PO$_4$)$_3$ | 1.0 | 0.50 | 1.00 | 1.00 | 2.80 | 10.75 | 2.64 |
| Example 26 | Li$_3$V$_2$(PO$_4$)$_3$ | 5.0 | 0.50 | 1.00 | 1.00 | 2.80 | 10.75 | 3.27 |
| Example 27 | Li$_3$V$_2$(PO$_4$)$_3$ | 15.0 | 0.50 | 1.00 | 1.00 | 2.80 | 10.75 | 3.18 |
| Example 28 | Li$_3$V$_2$(PO$_4$)$_3$ | 1.0 | 0.50 | 1.00 | 2.00 | 3.20 | 13.75 | 2.51 |
| Example 29 | Li$_3$V$_2$(PO$_4$)$_3$ | 5.0 | 0.50 | 1.00 | 2.00 | 3.20 | 13.75 | 2.96 |
| Example 30 | Li$_3$V$_2$(PO$_4$)$_3$ | 15.0 | 0.50 | 1.00 | 2.00 | 3.20 | 13.75 | 2.88 |
| Example 31 | Li$_3$V$_2$(PO$_4$)$_3$ | 1.0 | 3.00 | 0.10 | 1.00 | 2.80 | 10.65 | 2.77 |
| Example 32 | Li$_3$V$_2$(PO$_4$)$_3$ | 5.0 | 3.00 | 0.10 | 1.00 | 2.80 | 10.65 | 3.20 |
| Example 33 | Li$_3$V$_2$(PO$_4$)$_3$ | 15.0 | 3.00 | 0.10 | 1.00 | 2.80 | 10.65 | 3.00 |
| Example 34 | Li$_3$V$_2$(PO$_4$)$_3$ | 1.0 | 3.00 | 0.10 | 2.00 | 3.20 | 13.65 | 2.53 |
| Example 35 | Li$_3$V$_2$(PO$_4$)$_3$ | 5.0 | 3.00 | 0.10 | 2.00 | 3.20 | 13.65 | 2.85 |
| Example 36 | Li$_3$V$_2$(PO$_4$)$_3$ | 15.0 | 3.00 | 0.10 | 2.00 | 3.20 | 13.65 | 2.68 |
| Example 37 | Li$_3$V$_2$(PO$_4$)$_3$ | 1.0 | 3.00 | 1.00 | 1.00 | 2.80 | 12.00 | 2.64 |
| Example 38 | Li$_3$V$_2$(PO$_4$)$_3$ | 5.0 | 3.00 | 1.00 | 1.00 | 2.80 | 12.00 | 3.06 |
| Example 39 | Li$_3$V$_2$(PO$_4$)$_3$ | 15.0 | 3.00 | 1.00 | 1.00 | 2.80 | 12.00 | 2.87 |
| Example 40 | Li$_3$V$_2$(PO$_4$)$_3$ | 1.0 | 3.00 | 1.00 | 2.00 | 3.20 | 15.00 | 2.56 |
| Example 41 | Li$_3$V$_2$(PO$_4$)$_3$ | 5.0 | 3.00 | 1.00 | 2.00 | 3.20 | 15.00 | 2.88 |
| Example 42 | Li$_3$V$_2$(PO$_4$)$_3$ | 15.0 | 3.00 | 1.00 | 2.00 | 3.20 | 15.00 | 2.70 |
| Comparative Example 7 | Li$_3$V$_2$(PO$_4$)$_3$ | 0.8 | 1.02 | 0.13 | 1.91 | 3.00 | 12.03 | 1.36 |
| Comparative Example 8 | Li$_3$V$_2$(PO$_4$)$_3$ | 16.0 | 1.02 | 0.13 | 1.91 | 3.00 | 12.03 | 1.31 |
| Comparative Example 9 | Li$_3$V$_2$(PO$_4$)$_3$ | 0.8 | 1.50 | 0.50 | 1.50 | 3.00 | 12.00 | 1.29 |
| Comparative Example 10 | Li$_3$V$_2$(PO$_4$)$_3$ | 16.0 | 1.50 | 0.50 | 1.50 | 3.00 | 12.00 | 1.02 |
| Comparative Example 11 | Li$_3$V$_2$(PO$_4$)$_3$ | 0.8 | 2.00 | 1.00 | 1.00 | 3.00 | 12.00 | 0.80 |
| Comparative Example 12 | Li$_3$V$_2$(PO$_4$)$_3$ | 16.0 | 2.00 | 1.00 | 1.00 | 3.00 | 12.00 | 0.63 |
| Comparative Example 13 | Li$_3$V$_2$(PO$_4$)$_3$ | 0.8 | 0.50 | 0.02 | 1.00 | 2.80 | 9.28 | 1.08 |
| Comparative Example 14 | Li$_3$V$_2$(PO$_4$)$_3$ | 16.0 | 0.50 | 0.02 | 1.00 | 2.80 | 9.28 | 1.04 |
| Comparative Example 15 | Li$_3$V$_2$(PO$_4$)$_3$ | 0.8 | 0.50 | 1.00 | 2.00 | 3.20 | 13.75 | 0.89 |
| Comparative Example 16 | Li$_3$V$_2$(PO$_4$)$_3$ | 16.0 | 0.50 | 1.00 | 2.00 | 3.20 | 13.75 | 0.86 |
| Comparative Example 17 | Li$_3$V$_2$(PO$_4$)$_3$ | 0.8 | 3.00 | 0.10 | 1.00 | 2.80 | 10.65 | 0.96 |
| Comparative Example 18 | Li$_3$V$_2$(PO$_4$)$_3$ | 16.0 | 3.00 | 0.10 | 1.00 | 2.80 | 10.65 | 0.90 |
| Comparative Example 19 | Li$_3$V$_2$(PO$_4$)$_3$ | 0.8 | 3.00 | 1.00 | 2.00 | 3.20 | 15.00 | 0.86 |
| Comparative Example 20 | Li$_3$V$_2$(PO$_4$)$_3$ | 16.0 | 3.00 | 1.00 | 2.00 | 3.20 | 15.00 | 0.81 |

As described above, the all-solid-state battery of the present invention was effective in improving discharge capacity. By providing an all-solid-state battery with a high capacity, it has made a great contribution especially in the field of electronics.

DESCRIPTION OF REFERENCE NUMERALS

1 All-solid-state battery
2 Positive electrode layer
3 Negative electrode layer
4 Solid electrolyte layer
5 Package layer
6 Positive electrode current collector layer
7 Positive electrode active material layer
8 Negative electrode active material layer
9 Negative electrode current collector layer

What is claimed is:

1. An all-solid-state battery, comprising a solid electrolyte layer between a pair of electrode layers, wherein
   a positive electrode active material layer and a negative electrode active material layer constituting the pair of electrode layers contain lithium vanadium phosphate, the lithium vanadium phosphate contains a polyphosphate compound containing Li and V, the lithium vanadium phosphate contains Li$_3$V$_2$(PO$_4$)$_3$ as a main phase, and the lithium vanadium phosphate contains 1.0% by weight or more and 15.0% by weight or less of Li$_3$PO$_4$ relative to Li$_3$V$_2$(PO$_4$)$_3$, and
   wherein Li$_3$PO$_4$ is present in a grain boundary portion of the positive electrode active material layer or the negative electrode active material layer.

2. The all-solid-state battery according to claim 1, wherein the solid electrolyte layer contains lithium aluminum titanium phosphate.

3. The all-solid-state battery according to claim 2, wherein the material of the solid electrolyte is $Li_fAl_gTi_hP_iO_j$, wherein f, g, h, i, and j are numbers respectively satisfying $0.5 \leq f \leq 3.0$, $0.0 < g \leq 1.0$, $1.0 \leq h \leq 2.0$, $2.8 \leq i \leq 3.2$, and $9.25 < j \leq 15.0$.

4. The all-solid-state battery according to claim 1, wherein the pair of electrode layers and the solid electrolyte layer disposed between the pair of electrode layers have a relative density of 80% or above.

5. The all-solid-state battery according to claim 2, wherein the pair of electrode layers and the solid electrolyte layer disposed between the pair of electrode layers have a relative density of 80% or above.

6. The all-solid-state battery according to claim 3, wherein the pair of electrode layers and the solid electrolyte layer disposed between the pair of electrode layers have a relative density of 80% or above.

* * * * *